United States Patent
Chen et al.

(10) Patent No.: US 11,493,963 B2
(45) Date of Patent: Nov. 8, 2022

(54) ELECTRONIC DEVICE AND SCREEN FITTING METHOD

(71) Applicant: Lenovo (Beijing) Co., Ltd., Beijing (CN)

(72) Inventors: Zhi Chen, Beijing (CN); Xiaojing Yuan, Beijing (CN); Zhaokao Tian, Beijing (CN); Yunchao Zhang, Beijing (CN); Jun Liang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/035,665

(22) Filed: Sep. 28, 2020

(65) Prior Publication Data
US 2021/0096601 A1 Apr. 1, 2021

(30) Foreign Application Priority Data

Sep. 29, 2019 (CN) .......................... 201910930997.3

(51) Int. Cl.
*G06F 1/16* (2006.01)
(52) U.S. Cl.
CPC .......... *G06F 1/1652* (2013.01); *G06F 1/1647* (2013.01); *G06F 1/1656* (2013.01)
(58) Field of Classification Search
CPC .............................. G06F 1/1652; G06F 1/1656
See application file for complete search history.

(56) References Cited

U.S. PATENT DOCUMENTS

| 8,163,126 | B2 * | 4/2012 | Harada | B29C 65/7847 |
| | | | | 156/285 |
| 8,773,848 | B2 * | 7/2014 | Russell-Clarke | G06F 3/044 |
| | | | | 361/679.21 |
| 10,735,569 | B2 * | 8/2020 | Lynch | H04M 1/0202 |
| 11,137,799 | B2 * | 10/2021 | Myers | G06F 3/0487 |
| 2007/0190274 | A1 * | 8/2007 | Hamaguchi | F16L 49/04 |
| | | | | 428/34.4 |
| 2008/0223708 | A1 * | 9/2008 | Joo | G06F 1/165 |
| | | | | 200/600 |
| 2011/0261002 | A1 * | 10/2011 | Verthein | G06F 3/016 |
| | | | | 345/174 |
| 2012/0275097 | A1 * | 11/2012 | Lee | H04N 5/64 |
| | | | | 361/679.01 |
| 2013/0002133 | A1 * | 1/2013 | Jin | G06F 1/1626 |
| | | | | 313/511 |
| 2013/0002583 | A1 * | 1/2013 | Jin | G06F 1/1637 |
| | | | | 345/173 |

(Continued)

*Primary Examiner* — Adrian S Wilson
(74) *Attorney, Agent, or Firm* — Anova Law Group, PLLC (57) ABSTRACT

An electronic device includes a transparent cover and a flexible display screen. The transparent cover has a transparent cover having a fixed shape and including a plate-shape flat surface and a sidewall, the sidewall being formed by extending an edge of the flat surface away from the flat surface, the sidewall having a curved structure, and the sidewall and the flat surface forming an inverted structure; and a flexible display screen being fitted to an inner surface of the transparent cover, a display output surface of the flexible display screen facing the transparent cover, the flexible display screen including a non-deformable portion and a deformable portion, the non-deformable portion being fitted to the flat surface, and the deformable portion being fitted to the sidewall.

7 Claims, 10 Drawing Sheets

(56) References Cited

U.S. PATENT DOCUMENTS

| | | | | |
|---|---|---|---|---|
| 2013/0029075 | A1* | 1/2013 | Niiyama | G02F 1/133308 |
| | | | | 428/41.7 |
| 2013/0034685 | A1* | 2/2013 | An | H01L 27/1262 |
| | | | | 428/121 |
| 2013/0076649 | A1* | 3/2013 | Myers | G06F 1/1643 |
| | | | | 345/173 |
| 2013/0083496 | A1* | 4/2013 | Franklin | G06F 1/1677 |
| | | | | 361/749 |
| 2013/0107433 | A1* | 5/2013 | Mycroft | H05K 5/0017 |
| | | | | 361/679.01 |
| 2014/0002975 | A1* | 1/2014 | Lee | H05K 5/0217 |
| | | | | 361/679.01 |
| 2014/0104762 | A1* | 4/2014 | Park | G06F 1/1637 |
| | | | | 361/679.01 |
| 2014/0140037 | A1* | 5/2014 | Cho | B29C 37/0053 |
| | | | | 362/19 |
| 2014/0233194 | A1* | 8/2014 | Hongo | H05K 1/0283 |
| | | | | 361/749 |
| 2019/0278394 | A1* | 9/2019 | Myers | G06F 3/041 |

\* cited by examiner

ELECTRONIC DEVICE AND SCREEN FITTING METHOD

CROSS-REFERENCE TO RELATED APPLICATION

This application claims priority to Chinese Patent Application No. 201910930997.3, filed on Sep. 29, 2019, the entire content of which is incorporated herein by reference.

TECHNICAL FIELD

The present disclosure generally relates to an electronic device and a screen fitting method.

BACKGROUND

An electronic device includes a transparent cover and a display screen. Both of the transparent cover and the display screen have a flat plate structure. The electronic device supports the transparent cover and the display screen through a sidewall of a frame. The sidewall of the frame occupies a portion of the display area. Thus, the electronic device has a relatively large bezel area, and it is difficult to realize a narrow bezel design for the electronic device.

SUMMARY

Embodiments of the present disclosure provide an electronic device with a transparent cover and a flexible display screen. The transparent cover has a transparent cover having a fixed shape and including a plate-shape flat surface and a sidewall, the sidewall being formed by extending an edge of the flat surface away from the flat surface, the sidewall having a curved structure, and the sidewall and the flat surface forming an inverted structure; and a flexible display screen being fitted to an inner surface of the transparent cover, a display output surface of the flexible display screen facing the transparent cover, the flexible display screen including a non-deformable portion and a deformable portion, the non-deformable portion being fitted to the flat surface, and the deformable portion being fitted to the sidewall.

Embodiments of the present disclosure also provide a method for screen fitting. The method includes fitting a flexible display screen to an outer surface of an elastic rubber head of a fixture device, the elastic rubber head being configured to deform based on pressure inside the elastic rubber head; placing an transparent cover at a position having a first distance to the flexible display screen, the transparent cover having a fixed shape, the transparent cover including a flat surface and a sidewall, the sidewall being formed by extending an edge of the flat surface away from the flat surface; applying pressure inside the elastic rubber head, the elastic rubber head driving the flexible display screen to deform to match and fit an inner surface of the transparent cover, the sidewall having a curved structure, and the sidewall and the flat surface forming an inverted structure; and releasing the pressure inside the elastic rubber head to cause the elastic rubber head to deform to separate from the flexible display screen, the flexible display screen remaining fitted to the transparent cover, a non-deformable portion of the flexible display screen being fitted to the flat surface and the deformation portion of the flexible display screen being fitted to the sidewall.

| Reference numeral: | | |
|---|---|---|
| 110 - transparent cover | 112 - flat surface | 120 - sidewall |
| 121 - flexible screen | 122 - non-deformable portion | 123 - deformable portion |
| 130 - edge of deformable portion | 130 - transparent glue | 140 - supporting member |
| 150 - laser glue | 160 - frame body | 170 - back cover |
| 210 - elastic rubber head | 211 - first sidewall | 212 - second sidewall |
| 213 - connection sidewall | 214 - accommodation chamber | 215 - opening |
| 220 - base | | |

DETAILED DESCRIPTION OF THE EMBODIMENTS

The present disclosure is further described in detail in connection with accompanying drawings and specific embodiments. Specific embodiments described here are merely used to explain the present disclosure and not limit the present disclosure.

In the present disclosure, unless otherwise specified and limited, the term "connected" should be understood in a broad sense. For example, the term may include electrical connection, communication between two inner components, direct connection, connection through a medium therebetween. Those skilled in the art may understand specific meaning of the above-described term according to specific situation.

Terms of "first\second\third" of embodiments of the present disclosure only distinguish similar objects, and does not represent a specific order of objects. The specific order or sequence of the "first\second\third" is allowed to be interchangeable. The objects distinguished by "first\second\third" are interchangeable under an appropriate situation. As such, embodiments of the present disclosure described here may describe sequence embodiments in addition to the drawings or described sequences.

Embodiments of the present disclosure provide an electronic device. The electronic device is described in detail in connection with FIGS. 1-7.

In embodiments of the present disclosure, the electronic device includes a transparent cover 110 and a flexible display screen 120. The transparent cover 110 has a fixed shape. The transparent cover 110 includes a plate-shape flat surface 111 and a sidewall 112. The sidewall 112 is formed by extending the edge of the flat surface 111 away from the flat surface 111. The sidewall 112 is a curved shape structure. The sidewall 112 and the flat surface 111 form an inverted structure. The flexible display screen 120 is fitted on the inner surface of the transparent cover 110. The display output surface of the flexible display screen 120 faces the transparent cover 110. The flexible display screen 120 includes a non-deformable portion 121 and a deformable portion 122. The non-deformable portion 121 is fitted to the flat surface 111. The deformable portion 122 is fitted to the sidewall 112.

Figure 6:
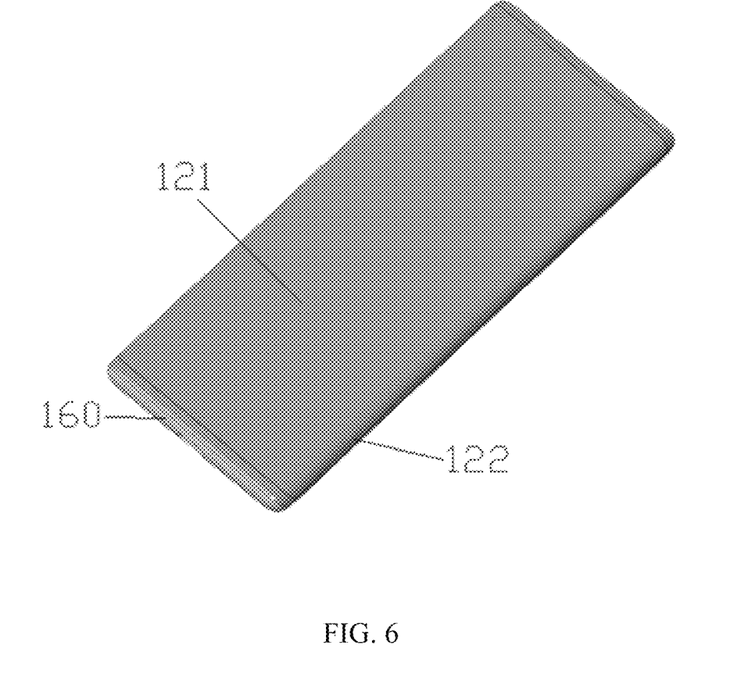
FIG. 6 illustrates a schematic structural diagram of the electronic device according to some embodiments of the present disclosure.
Figure 7:
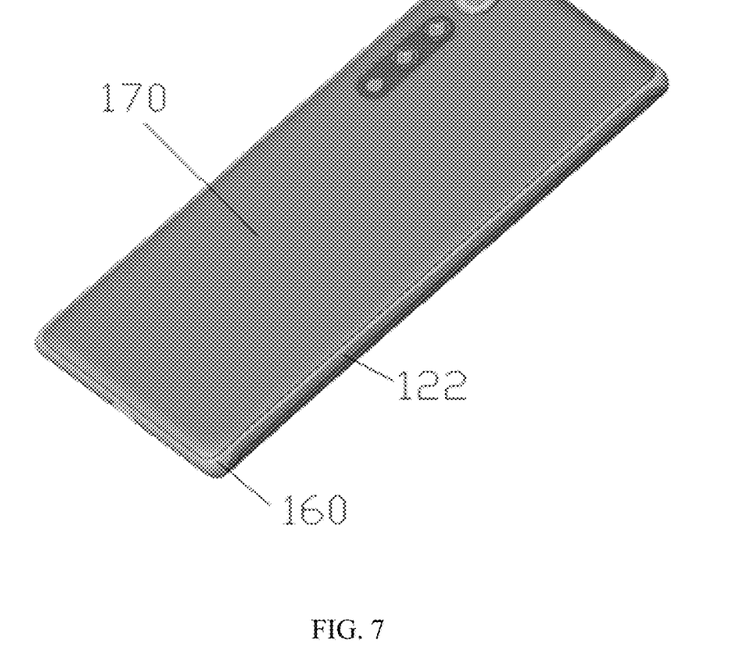
FIG. 7 illustrates a schematic structural diagram of the electronic device according to some embodiments of the present disclosure.

In some embodiments, the structure of the electronic device is not limited. For example, the electronic device may include a laptop or a game console. For example, as shown in FIG. 6 and FIG. 7, the electronic device is a cell phone.

In some embodiments, the transparent cover 110 has a fixed shape, that is, the transparent cover 110 does not deform.

A material of the transparent cover 110 is not limited. For example, the material of the transparent cover 110 may include glass or plastic.

The structure of the transparent cover 110 is not limited, as long as the transparent cover 110 includes the plate-shape flat surface 111 and the sidewall 112.

The flat surface 111 may have a plate-shape structure. In other embodiments, the flat surface 111 may have a nearly plate-shape structure. That is, the flat surface 111 may have a plate-shape structure with a small curved surface.

The sidewall 112 has a curved structure. In some embodiments, the sidewall 112 may include a ring structure or a plurality of ring structures. When the sidewall 112 includes the plurality of ring structures, the plurality of ring structures are smoothly combined to form a curved sidewall 112.

The sidewall 112 is formed by extending the edge of the flat surface 111 away from the flat surface 111. That is, the sidewall 112 is formed by extending the edge of the flat surface 111 away from the plane where the flat surface 111 is located.

The sidewall and the flat surface form the inverted structure. The sidewall forms a frame structure of the electronic device. That is, the sidewall forms the edge portion of the electronic device, and an end surface of the sidewall exceeds the edge portion formed by the sidewall.

In some embodiments, the flexible display screen 120 is placed on the inner surface of the transparent cover 110. The display output surface of the flexible display screen 120 faces the transparent cover 110. That is, the display output surface of the flexible display screen 120 is fitted to the inner surface of the transparent cover 110.

Figure 2:
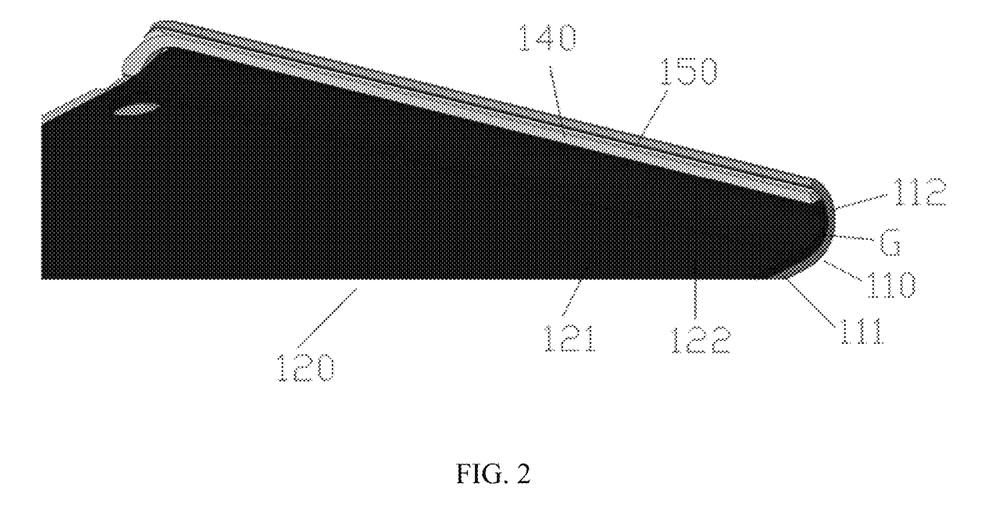
FIG. 2 illustrates a schematic partial structural diagram of the electronic device according to some embodiments of the present disclosure.

The inner surface of the transparent cover 110 refers to the surface where the flat surface 111 and the sidewall 112 form the recessed side of the recessed structure. For example, as shown in FIG. 2, the inner surface of the transparent cover 110 is the surface of the G side of the transparent cover 110.

The implementation of placing the flexible display screen 120 on the inner surface of the transparent cover 110 is not limited. For example, the flexible display screen 120 and the transparent cover 110 are bond by a transparent glue 130 to form an integrated structure. The type of the transparent glue 130 is not limited, as long as the flexible display screen 120 can be bond to the transparent cover 110, and the flexible display screen 120 can display through the transparent glue 130. For example, the transparent glue 130 may include an optically clear adhesive (OCA).

In other embodiments, the flexible display screen 120 and the transparent cover 110 may form the integrated structure through other methods.

In some embodiments, the flexible display screen 120 includes the non-deformable portion 121 and the deformable portion 122. The non-deformable portion is fitted to the flat surface 111, such that the non-deformable portion 121 can display through the flat surface 111. The deformable portion 122 is fitted to the sidewall 112, such that the formable portion 122 can display through the sidewall 112.

The non-deformable portion 121 does not mean this portion has no deformation at all. If the flat surface 111 has the plate-shape structure with the small curved surface, the non-deformable portion 121 may also have minor deformation. When the flat surface 111 has a plate-shape structure, the non-deformable portion 121 does not have deformation.

In some embodiments, the quantity and setting location of the sidewall 112 are not limited. The quantity of the sidewall 112 may be one or at least two. When the quantity of the sidewall 112 is at least two, the at least two sidewalls 112 may be provided on neighboring sides of the flat surface 111, or the at least two sidewalls 112 may be provided on opposite sides of the flat surface 111.

For example, as shown in FIG. 6 and FIG. 7, the sidewalls 112 are formed by extending edges of the two long sides of the flat surface 111 away from the flat surface 111. The quantity of the sidewalls 112 is two. The flat surface 111 may have a cuboid structure.

For another example, the sidewalls 112 are formed by extending edges of the two short sides of the flat surface 111 away from the flat surface 111. The quantity of the sidewalls 112 is two. The flat surface 111 may have the cuboid structure.

For still another example, two sidewalls 112 are formed by extending edges of the two long sides of the flat surface 111 away from the flat surface 111, and the other two sidewalls 112 are formed by extending boundaries of the two short sides of the flat surface 111 away from the flat surface 111. The quantity of the sidewalls 112 is four. The flat surface 111 may have the cuboid structure. The sidewalls 112 and the flat surface 111 may form a box shape structure.

In some embodiments, the sidewall 112 include an arc-shaped first inner surface. A tangent line of a target point on the first inner surface is perpendicular to the flat surface 111 of the transparent cover 110, and the target point is not an end point of the arc-shaped inner surface.

Figure 3:
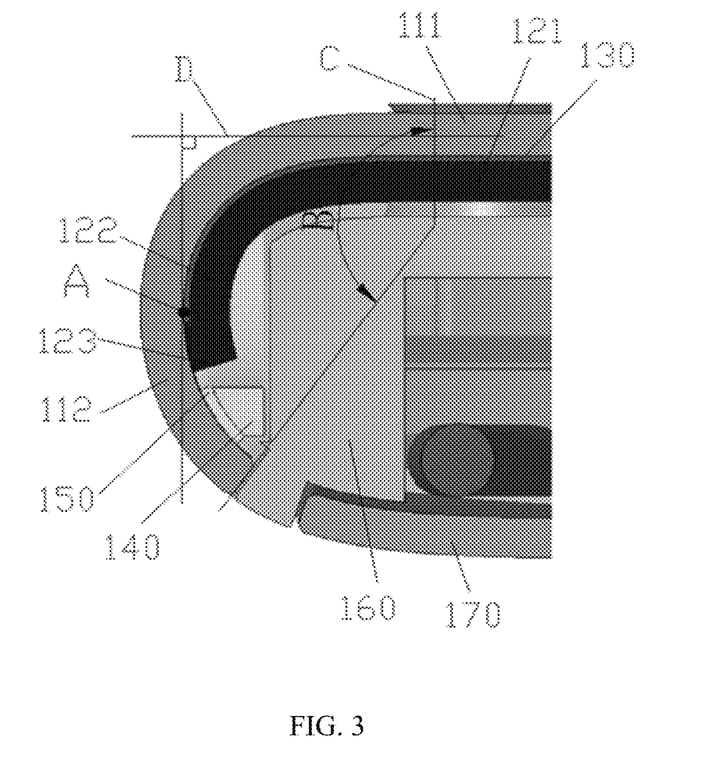
FIG. 3 illustrates a schematic partial structural diagram of the electronic device according to some embodiments of the present disclosure.

In some embodiments, the first inner surface is an arc surface having a largest vertical plane distance to the flat surface 111. The vertical plane of the flat surface 111 is a surface vertical to the plane where the flat surface 111 is located. As shown in FIG. 3, the plane C is a vertical plane to the plane D where the flat surface 111 is located.

The inner surface of the sidewall 112 may include one arc surface or a plurality of arc surfaces. When the inner side of the sidewall 112 includes the plurality of arc surfaces. The plurality of arc surfaces are smoothly combined.

The target point is a point having the longest vertical plane distance to the flat surface 111. That is point A shown in FIG. 3 and FIG. 5.

The target point is not an end point of the first inner surface. That is, the end point of the first inner surface exceeds the target point. The sidewall 112 exceeds the region having the largest vertical plane distance to the flat surface 111. Therefore, the sidewall 112 forms the inverted structure, and the sidewall 112 forms an outer frame structure of the electronic device.

In some embodiments, position of the edge 123 of the deformable portion of the flexible display screen 120 is not limited. The edge 123 of the deformable portion is the edge end of the deformable portion.

For example, the edge 123 of the deformable portion of the flexible display screen 120 is at the target point. Therefore, the flexible display screen 120 reaches the farthest end of the sidewall 112, such that the display screen does not have a frame at the sidewall 112. As such, the display area of the electrical device is greatly improved.

For another example, the edge 123 of the deformable portion of the flexible display screen 120 exceeds the target point. Therefore, the flexible display screen 120 exceeds the farthest end of the sidewall 112, such that the display screen does not have a frame at the sidewall 112. As such, the display area of the electrical device is greatly improved.

In some embodiments, as shown in FIG. 3, the edge 123 of the deformable portion of the flexible display screen 120 may be coplanar with the edge of the sidewall 112, or have a certain distance to the edge of the sidewall 112.

In some embodiments, position of the edge of the sidewall 112 is not limited, as long as the target point is not the end point of the first inner surface.

For example, as shown in FIG. 3, the vertical plane of the flat surface 111 and the end surface of the sidewall 112 form a first angle. The first angle B is greater than 90°.

The value of the first angle B is not limited. For example, the first angle B may range from 140° to 170°, such that the sidewall 112 covers most of a side of the electronic device. For example, as shown in FIG. 3, the angle B is 150°, the sidewall 112 forms the whole side frame of the electronic device.

Figure 4:
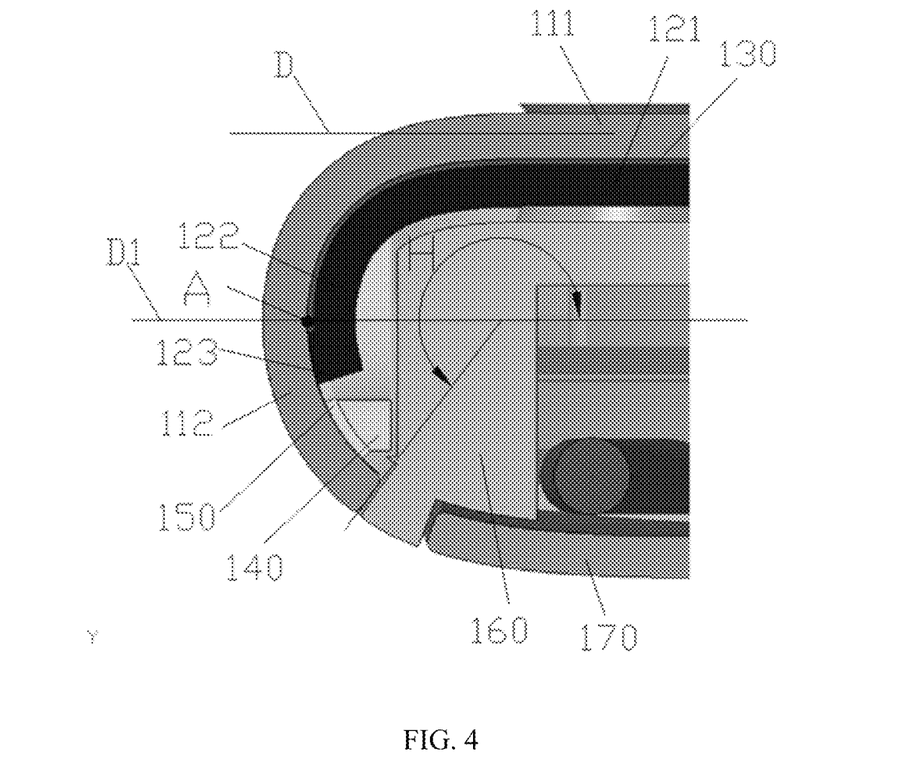
FIG. 4 illustrates a schematic partial structural diagram of the electronic device according to some embodiments of the present disclosure.

For another example, the plane where the flat surface 111 is located forms a second angle H with the end surface of the sidewall 112. As shown in FIG. 4, the second angle H is greater than 180°. To facilitate marking, a plane D1 is formed by parallelly moving the plane D where the flat surface 111 is located.

The second angle H is not limited. For example, the second angle H ranges from 230° to 260°, such that the sidewall 112 covers most of the side of the electronic device. For example, as shown in FIG. 7, the second angle H is 240°, the sidewall 112 forms the whole side frame of the electronic device.

In some embodiments, the quantity and setting position of the sidewall 112 are described above, and are not repeated here.

Figure 5:
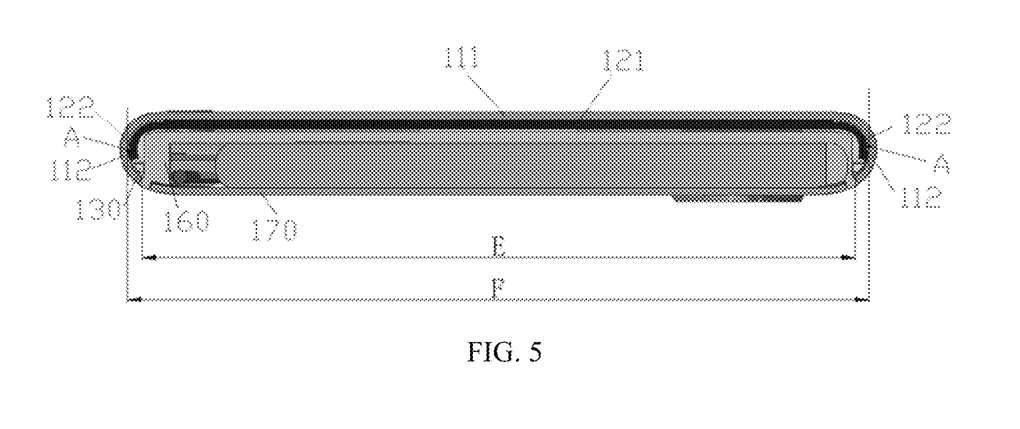
FIG. 5 illustrates a schematic section view of the electronic device according to some embodiments of the present disclosure.

For example, as shown in FIG. 5, the transparent cover 110 includes at least two sidewalls 112. The at least two sidewalls 112 are located on the opposite sides of the flat surface 111. The edges of the at least two sidewalls 112 have a first width E. The target points A of the at least two sidewalls 112 have a second width F. The first width E is smaller than the second width F, such that the two sidewalls 112 and the flat surface 111 covers the front side of the electronic device and also cover the opposite sides of the electronic device. As such, the front surface and two sidewalls of the electronic device form an integrated structure shown in FIG. 6. Therefore, the structure of the electronic device is simplified, and the front surface of the electronic device is tidier.

If the edge of the deformable portion of the flexible display screen 120 exceeds the target point, the electronic device can display at the two sidewall 112 without the frame. As such, the display area of the electronic device is greatly increased.

The front surface of the electronic device refers to the surface of the non-deformable portion 121 of the flexible display screen 120 that can display.

In some embodiments, the electronic device may further include a supporting member 140 and a frame body 160. The supporting member 140 is configured to support the portion of the deformable portion 122 near the frame end. The frame body 160 is configured to support the non-deformable portion 121 and the portion of the formable portion 122 away from the edge end.

In some embodiments, the supporting member 140 is fixed at the transparent cover 110 at a position corresponding to the edge 123 of the deformable portion of the flexible display screen 120. The supporting member 140 is configured to support the portion of the deformable portion 122 near the edge end. As such, the supporting member 140 prevents the transparent cover 110 and the portion of the deformable portion 122 near the edge end from being deformed due to excessive force.

The supporting member 140 may directly contact the portion of the deformable portion 122 near the edge end. In some embodiments, a buffering member may be provided between the supporting member 140 and the portion of the deformed portion 122 near the edge end.

The implementation of fixing the supporting member 140 at the transparent cover 110 is not limited. For example, the supporting member 140 may be adhered to the transparent cover 110 through a laser glue 150, such that the position of the supporting member 140 can be adjusted when the supporting member 140 is adhered to the transparent cover 110. That is, the supporting member 140 can be initially positioned to the transparent cover through the laser glue 150. At this point, the laser glue 150 is in a weak adhesive state, thus, the position of the supporting member 140 may be adjusted as needed. After the position between the supporting member 140 and the transparent cover 110 is determined, the laser glue 150 is activated. Thus, the supporting member 140 is adhered and fixed to the transparent cover 110.

Those of skilled in the art may fixedly connect the supporting member 140 to the transparent cover 110 through other methods.

In some embodiments, the structure of the frame body 160 is not limited, as long as the transparent cover 110 having the flexible display screen 120 can be mounted at the frame body 160, and the frame body 160 can support the non-deformable portion 121 and the portion of the deformable portion 122 away from the edge end. For example, a first portion of the frame body 160 may contact the non-deformable portion 121 and the deformable portion 122 to prevent the transparent cover 110 and the portion of the deformable portion 122 away from the edge end from being deformed due to an excessive force. In other embodiments, the frame body 160 may support the non-deformable portion 121 and the portion of the deformable portion 122 away from the edge end through another structure. For example, a buffering member is provided between the frame body 160 and the non-deformable portion 121, and between the frame body 160 and the portion of the deformable portion 122 away from the edge end.

Figure 1:
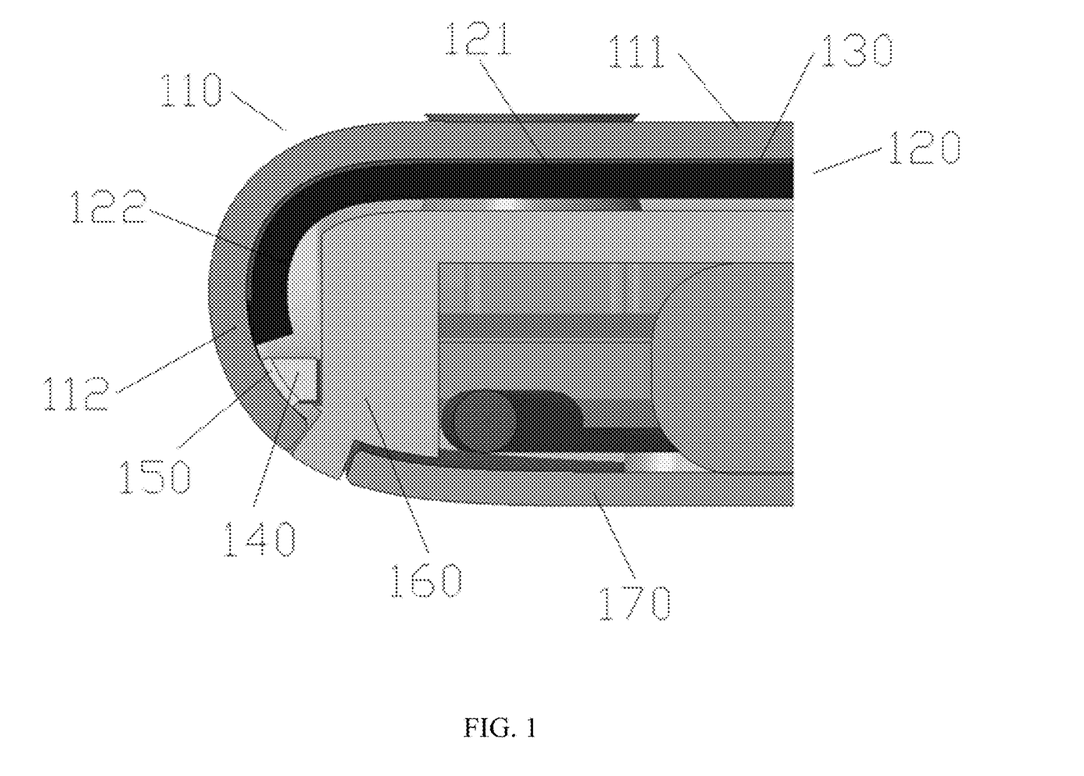
FIG. 1 illustrates a schematic partial structural diagram of an electronic device according to some embodiments of the present disclosure.

As shown in FIG. 1, if the transparent cover 110 having the flexible display screen 120 is mounted at the frame body 160, the frame body 160 abuts the supporting member 140. As such, the force applied on the portion of the deformable portion 122 near the edge end and the transparent cover 110 may be transferred to the frame body 160 through the supporting member 140, and the supporting member 140 is prevented from moving. The supporting member 140 may abuts the frame body 160 through other structural members.

In some embodiments, the frame body 160 is further configured to mount at least one electronic component and a back cover 170.

The type of the electronic component is not limited. For example, when the electronic device is a cell phone. The electronic component may include a commonly used electronic component in the cell phone, such as a processor, a power source, etc.

The back cover 170 is not limited. For example, the back cover 170 may include a glass cover.

In the electronic device of embodiments of the present disclosure, the transparent cover 110 includes the flat surface 111 and the curved sidewall 112. The flexible display screen 120 includes the non-deformable portion 121 and the formable portion 122. The non-deformable portion 121 is fitted to the flat surface 111. The formable portion 122 is fitted to the sidewall 112. The formable portion 122 can display at the curved sidewall 112, such that the frame width of the electronic device may be reduced to realize a narrow bezel design for the electronic device.

Embodiments of the present disclosure further provide a fixture device. The above-described flexible display screen 120 is fitted to the inner surface of the transparent cover 110 using the fixture device. The fixture device is described in detail in connection with the FIGS. 8-12.

The fixture device of embodiments of the present disclosure includes an elastic rubber head 210 and a base 220. The elastic rubber head 210 may deform based on the pressure inside the elastic rubber head 210. The base 220 is fixedly connected to the elastic rubber head 210. The base 220 is configured to support the elastic rubber head 210. The outer surface of the elastic rubber head 210 is configured to fit the flexible display screen 120. The outer surface of the elastic rubber head 210 fits the flexible display screen 120 and the transparent cover 110, and corresponds to the position of the flexible display screen 120. By applying pressure inside the elastic rubber head 210, the elastic rubber head 210 can drive the flexible display screen 120 to deform, such that the flexible display screen 120 matches the shape of the inner surface of the transparent cover 110 to fit to the transparent cover 110. By releasing the pressure inside the elastic rubber head 210, the elastic rubber head 210 can deform to separate from the flexible display screen 120. The flexible display screen 120 can remain fitted to the transparent cover 110.

In embodiments of the present disclosure, the transparent cover 110 has a fixed shape. The transparent cover 110 includes a plate-shape flat surface 111 and a sidewall 112. The sidewall 112 is formed by extending the edge of the flat surface 111 away from the flat surface 111. The sidewall 112 has a curve structure. The sidewall 112 and the flat surface 111 form an inverted structure. The non-deformable portion 121 of the flexible display screen 120 is fitted to the flat surface 111. The deformable portion of the flexible display screen 120 is fitted to the sidewall 112.

The transparent cover 110 and the flexible display screen 120 correspond to the transparent cover 111 and the flexible display screen 120 described in above electronic device embodiments, respectively. The description of the transparent cover 110 and the flexible display screen 120 in above electronic device embodiments is also suitable for the transparent cover 110 and the flexible display screen 120, which is not repeated here.

In some embodiments, by releasing the pressure inside the elastic rubber head 210, the implementation of maintaining the flexible display screen 120 to be fitted to the transparent cover 110 is not limited. For example, a transparent glue may be provided between the flexible display screen 120 and the transparent cover 110. The flexible display screen 120 may remain fitted to the transparent cover 110 through the transparent glue 130. In above electronic device embodiments, the implementation for fitting the transparent cover 110 to the flexible display screen 120 is described, which is not repeated here.

In some embodiments, the structure of the base 220 is not limited, as long as the base 220 is fixedly connected to the elastic rubber head 210, and the base 220 can support the elastic rubber head 210. For example, the base 220 may include a plate-shape structure.

The implementation of fixedly connecting the base 220 to the elastic rubber head 210 is not limited. For example, the base 220 may fixedly connected to the elastic rubber head 210 by a bonding glue. For another example, the base 220 may be fixedly connected to the elastic rubber head 210 by a clamping structure.

In some embodiments, the implementation of fitting the flexible display screen 120 to the elastic rubber head 210 is not limited. For example, the flexible display screen 120 may be fitted to the outer surface of the elastic rubber head 210 through the bonding glue. The bonding glue has a weak adhesion, as long as the flexible display screen 120 does not separate from the outer surface of the elastic rubber head 210. As such, by releasing the pressure inside the elastic rubber head, the elastic rubber head 210 may deform to separate from the flexible display screen 120 quickly. For another example, the roughness level of the outer surface of the elastic rubber head 210 is relatively small, and the roughness level of the outer surface of the flexible display screen 120 is also relatively small. Thus, the flexible display screen 120 may be directly absorbed to the outer surface of the elastic rubber head 210.

The implementation that the elastic rubber head 210 deforms based on the pressure inside the elastic rubber head 210 is not limited.

For example, the elastic rubber head 210 includes an accommodation chamber 214. The accommodation chamber 214 is filled with a medium. By applying force to press the elastic rubber head 210, the pressure of the medium filled in the accommodation chamber 214 is increased. The elastic rubber head 210 deforms based on the increasing pressure of the filled medium.

The filled medium may include liquid, gas, or a combination thereof.

For another example, the elastic rubber head 210 includes an accommodation chamber 214 and an opening 215. The opening 215 communicates with the accommodation chamber 214. The medium can be filled into the accommodation chamber 214 through the opening 214. The elastic rubber head 210 can deform based on the pressure of the filled medium.

In this example, the filled medium may include liquid or gas. When the filled medium is liquid, the deformation of the elastic rubber head 210 corresponds to the amount of the filled medium injected into the accommodation chamber 214. As such, the amount of the filled medium rejected into the accommodation chamber 214 may be controlled based on the formation of the elastic rubber head 210. Thus, the operation is more intuitive.

Figure 8:
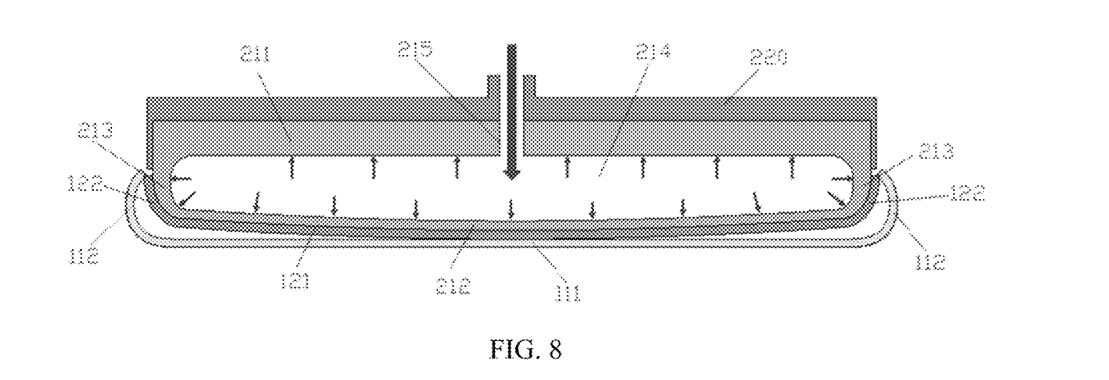
FIG. 8 illustrates a schematic structural diagram of the electronic device according to some embodiments of the present disclosure.

In this example, as shown in FIG. 8, the base 220 may be fixed to the outer surface of the first sidewall 211, which forms the accommodation chamber 214. The base 220 is configured to support the first sidewall 211, such that the first sidewall 211 does not deform when the elastic rubber head 210 deforms.

In other embodiments, the base 220 may be fixed to a partial region of the outer surface of the first sidewall 211. When the elastic rubber head 210 deforms, the region that the first sidewall 211 contacts the base 220 does not deform. Other regions of the first sidewall 211 deform.

In some embodiments, as shown in FIG. 8, the outer surface of the second sidewall 212 that forms the accommodation chamber 214 is configured to fit the non-deformable portion 121 of the flexible display screen 120. When the elastic rubber head 210 deforms, the non-deformable portion 121 of the flexible display screen 120 may be fitted to the flat surface 111 of the transparent cover 110 as the second sidewall 212 deforms.

The second sidewall 212 is opposite to the first sidewall 211.

In some embodiments, as shown in FIG. 8, the outer surface of the connection sidewall 213 that forms the accommodation chamber 214 is configured to fit the deformable portion 122 of the flexible display screen 120. When the elastic rubber head 210 deforms, the deformable portion 122 of the flexible display screen may be fitted to the sidewall 112 of the transparent cover 110 as the connection sidewall 213 deforms.

The connection sidewall 213 is connected to the first sidewall 211 and the second sidewall 212.

Figure 10:
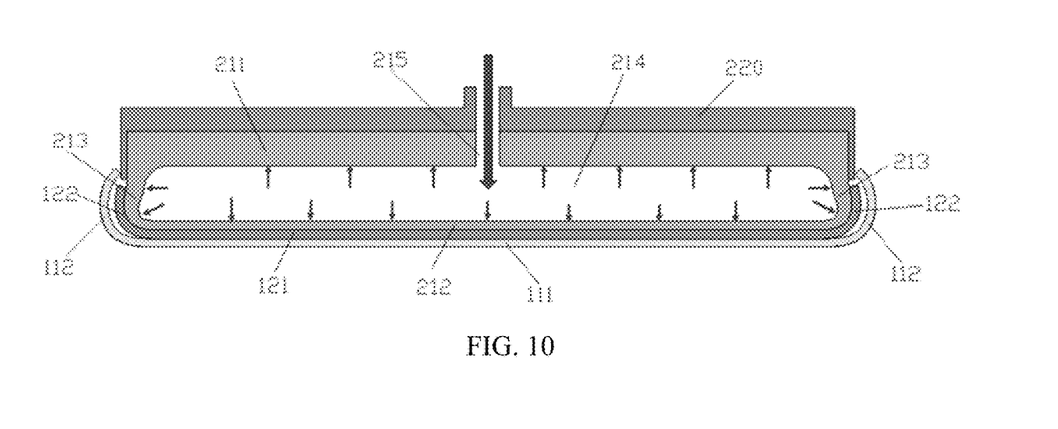
FIG. 10 illustrates a schematic structural diagram of the electronic device according to some embodiments of the present disclosure.
Figure 12:
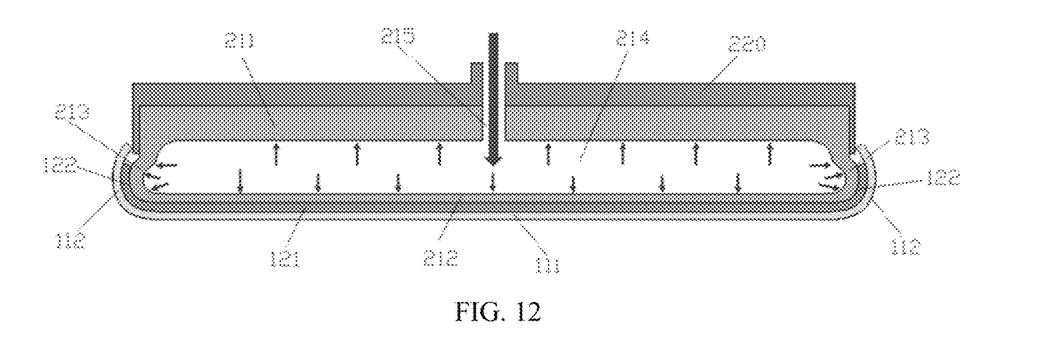
FIG. 12 illustrates a schematic structural diagram of the electronic device according to some embodiments of the present disclosure.

FIG. 8, FIG. 10, and FIG. 12 illustrate an example of the transparent cover 110. The transparent cover 110 includes two opposite sidewalls 112. The flexible display screen 120 include two opposite deformable portions 122. The positions and quantities of the sidewall 112 and the deformable portion 122 are not limited. For example, only one connection sidewall may be provided. Then, the first sidewall 211 may be connected to the second sidewall 212 through the one connection sidewall 213, or through a supporting sidewall. The supporting sidewall may abut the base 220, such that the supporting sidewall does not deform when the elastic rubber head 210 deforms. In other embodiments, the supporting sidewall may not abut the base 220, as long as the surface of the supporting sidewall is not fitted to the flexible display screen 120.

In some embodiments, the position of the opening 215 is not limited. For example, as shown in FIG. 8, the opening 215 may be provided at the first sidewall 211. Then, the base 220 may be provided with a through groove corresponding to the opening 215. In other embodiments, the opening 215 may be provided at the supporting sidewall between the first sidewall 211 and the second sidewall 212.

In some embodiments, the following processes may avoid gas between the flexible display screen 120 and the transparent cover 110. The outer surface of the elastic rubber head 210 is fitted to the flexible display screen 120 and the transparent cover 110, and corresponds to the position of the flexible display screen 120. When the pressure of the accommodation chamber 214 is gradually increased, the second sidewall 212 may first drive the middle portion of the non-deformable portion 121 to the connection end of the non-deformable portion 121 to be gradually fitted to the flat surface 111 of the transparent cover 110. The connection sidewall 213 then drives the connection end of the deformable portion 122 to the edge end of the deformable portion 122 to gradually fit to the sidewall of the transparent cover 110. As such, the gas between the flexible display screen 120 and the transparent cover 110 can be gradually expelled from both sides.

The connection end of the non-deformable portion 121 is an end of the non-deformable portion 121 connected to the deformable portion 122. The connection end of the deformable portion 122 is an end of the deformable portion 122 connected to the non-deformable portion 121.

The implementation of fitting the middle of the flexible display screen 120 to the edge end of the flexible display screen 120 to the transparent cover 110 is not limited.

For example, the thickness of the connection sidewall 213 increases from the first end of the connection sidewall 213 to the second end of the connection sidewall 213. The first end of the connection sidewall 213 is an end of the connection sidewall 213 connected to the second sidewall 212. The second end of the connection sidewall 213 is an end of the connection sidewall 213 connected to the first sidewall 211. The thickness of the edge end of the second sidewall 212 is the same as the thickness of the first end of the connection sidewall 213.

Figure 9:
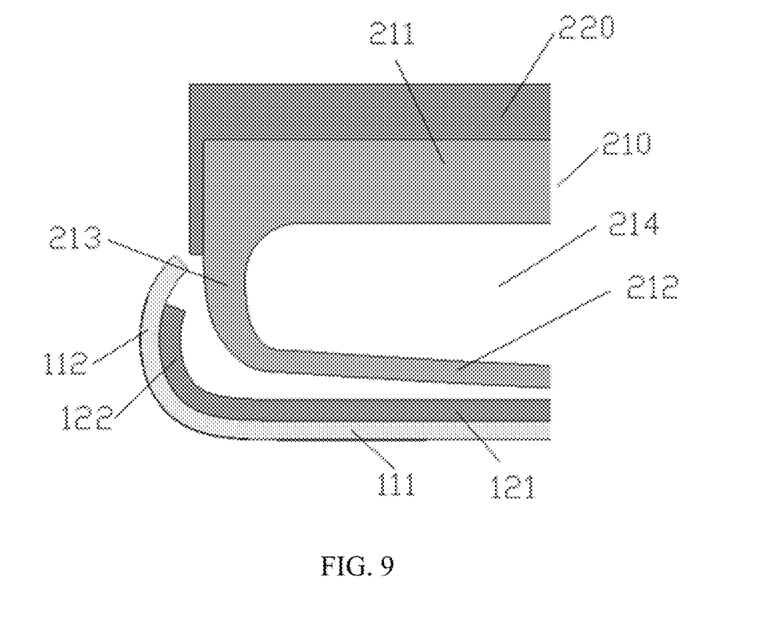
FIG. 9 illustrates a schematic partial structural diagram of the electronic device according to some embodiments of the present disclosure.
Figure 11:
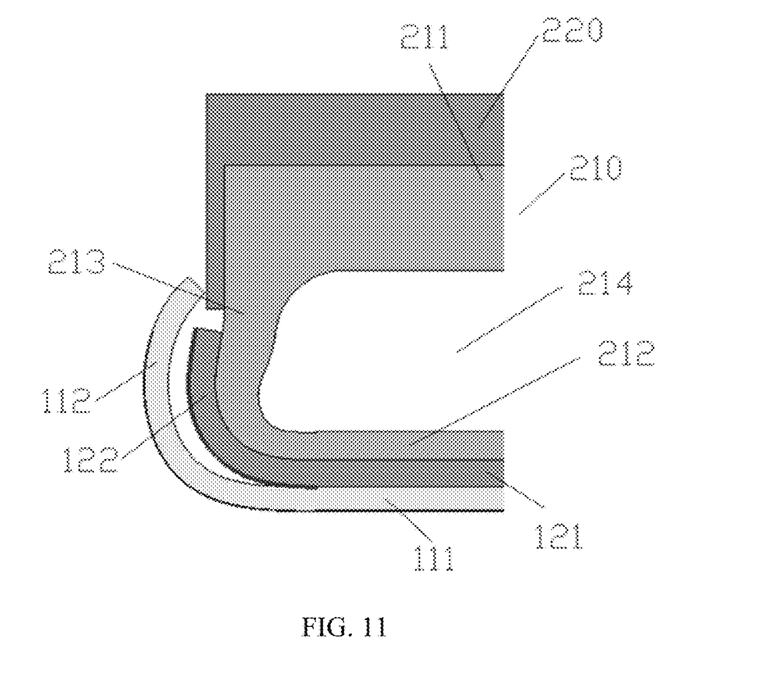
FIG. 11 illustrates a schematic partial structural diagram of the electronic device according to some embodiments of the present disclosure.

In the example, the thickness of the second sidewall 212 may be even, and the outer surface of the second sidewall 212 is a convex surface. As shown in FIG. 8 and FIG. 9, the outer surface of the elastic rubber head 210 is fitted to the flexible display screen 120 and the transparent cover 110, and corresponds to the position of the flexible display screen 120. Under this situation, the elastic rubber head 210 may be first controlled to drive the flexible display screen 120 to move toward the transparent cover 110 until the middle portion of the non-deformable portion 121 of the flexible display screen 120 contacts the flat surface 111 of the transparent cover 110. As shown in FIG. 8, the pressure in the elastic rubber head 210 is gradually increased. Since the outer surface of the second sidewall 212 may be the convex surface, and the thickness of the second sidewall 212 is even, the deformation of the different positions of the second sidewall 212 is the same. The non-deformable portion 121 of the flexible display screen 120 first contacts the region of the flat surface 111 of the transparent cover 110, which has a smaller distance to the flexible display screen 120. The non-deformable portion 121 of the flexible display screen 120 then contacts the region of the flat surface 111 of the transparent cover 110, which has a larger distance to the flexible display screen 120. The second sidewall 212 can first drive the middle portion of the non-deformable portion 121 to the connection end of the non-deformable portion 121 to fit the flat surface 111 of the transparent cover 110. As shown in FIG. 10 and FIG. 11, since the thickness of the connection sidewall 213 increases gradually from the first end of the connection sidewall 213 to the second end of the connection sidewall 213, and the thickness of the first end of the connection sidewall 213 is the same as the thickness of the edge end of the second sidewall 212, the connection sidewall 213 has a minor deformation relative to the second sidewall 212. The deformation of the connection sidewall 213 decreases gradually from the first end of the connection sidewall 213 to the second end of the connection sidewall 213. As shown in FIG. 12, as the pressure in the elastic rubber head 210 continues to increase, the connection sidewall 213 drives the connection end of the deformable portion 122 to the edge end of the deformable portion 122 to gradually fit to the sidewall 112 of the transparent cover 110.

The structure of driving the elastic rubber head 210 to move is not limited. For example, a telescopic cylinder or an oil cylinder may drive the elastic rubber head 210 to move. The telescopic cylinder or the oil cylinder are fixedly connected to the base 220. For another example, a drive assembly formed by a worm gear, a worm shaft, and an electrical motor can also drive the elastic rubber head 210 to move. The worm shaft is fixedly connected to the base 220. The worm gear is fixed at the output shaft of the electrical motor. The worm gear meshes with the worm shaft.

When the outer surface of the elastic rubber head 210 is fitted to the flexible display screen 120 and the transparent cover 110, and corresponds to the position of the flexible display screen 120, the elastic rubber head 210 may not be controlled to move. Then, the distance between the flexible display screen 120 and the transparent cover 110 may be set to a small value. By directly increasing the pressure in the elastic rubber head 210, the elastic rubber head 210 deforms to drive the flexible display screen 120 to move toward the transparent cover 110 until the middle portion of the non-deformable portion 121 of the flexible display screen 120 contacts the flat surface 111 of the transparent cover 110.

In some embodiments, the distance between the outer surface of the second sidewall 212 and the first sidewall 211 may decrease gradually from the middle portion of the outer surface of the second sidewall 212 to both ends of the outer surface of the second sidewall 212. As such, the second sidewall 212 can first drive the middle portion of the non-deformable portion 121 to the connection end of the non-deformable portion 121 to gradually fit to the flat surface 111 of the transparent cover 110. Therefore, the gas between the non-deformable portion 121 and the flat surface 111 can be effectively prevented.

The outer surface of the second sidewall 212 may be a symmetrical convex surface, or an asymmetrical convex surface.

For an example, the thickness of the second sidewall 212 may gradually increased from the middle of the second sidewall 212 to the edge end of the second sidewall 212. Therefore, the deformation of the second sidewall 212 increases gradually from the middle of the second sidewall 212 to the edge end of the second sidewall 212. As such, the second sidewall 212 may first drive the middle portion of the non-deformable portion 121 to the connection end of the non-deformable portion 121 to gradually fit to the flat surface 111 of the transparent cover 110.

The distance between the outer surface of the second sidewall 212 from the middle of the second sidewall 212 to the edge end of the second sidewall 212 and the first sidewall 211 may be the same. That is, the outer surface of the second sidewall 212 may be a flat surface.

The fitting process of the flexible display screen 120 and the transparent cover 110 is similar to the fitting process of the flexible display screen 120 and the transparent cover 110 under the above-described situation that the thickness of the second sidewall 212 is even, which is not repeated here.

For an example, the thickness of the second sidewall 212 may gradually increase from the middle of the second sidewall 212 to the edge end of the second sidewall 212. The outer surface of the second sidewall 212 may also be a convex surface. Based on the deformation and shape, the second sidewall 212 can first drive the middle portion of the non-deformable portion 121 to the connection end of the non-deformable portion 121 to gradually fit to the flat surface 111 of the transparent cover 110.

In embodiments of the present disclosure, a fixture device includes an elastic rubber head 210 and a base 220. The elastic rubber head 210 may deform based on the pressure in the elastic rubber head 210. The base 220 is fixedly connected to the elastic rubber head 210. The base 220 is configured to support the elastic rubber head 210. The outer surface of the elastic rubber head 210 is fitted with a flexible display screen 120, and the position of the transparent cover 110 corresponds to the position of the flexible display screen 120. By applying the pressure to the elastic rubber head 210, the elastic rubber head 210 may drive the flexible display screen 120 to deform, such that the flexible display screen 120 matches to the shape of the inner surface of the transparent cover 110 and is fitted to the transparent cover 110. By releasing the pressure of the elastic rubber head 210, the elastic rubber head 210 may deform to separate from the flexible display screen 120. The flexible display screen 120 can remain fitted to the transparent cover 110. The flexible display screen 120 is fitted to the transparent cover 110 through the deformable elastic rubber head 210.

Embodiments of the present disclosure further provide a screen fitting method. Screen fitting method embodiments corresponds to above-described device embodiments. Therefore, the operation and features described in embodiments of the fixture device may be suitable for screen fitting method embodiments, which are not repeated here. The screen fitting method is described in detail in connection with FIGS. 13-15.

Figure 13:
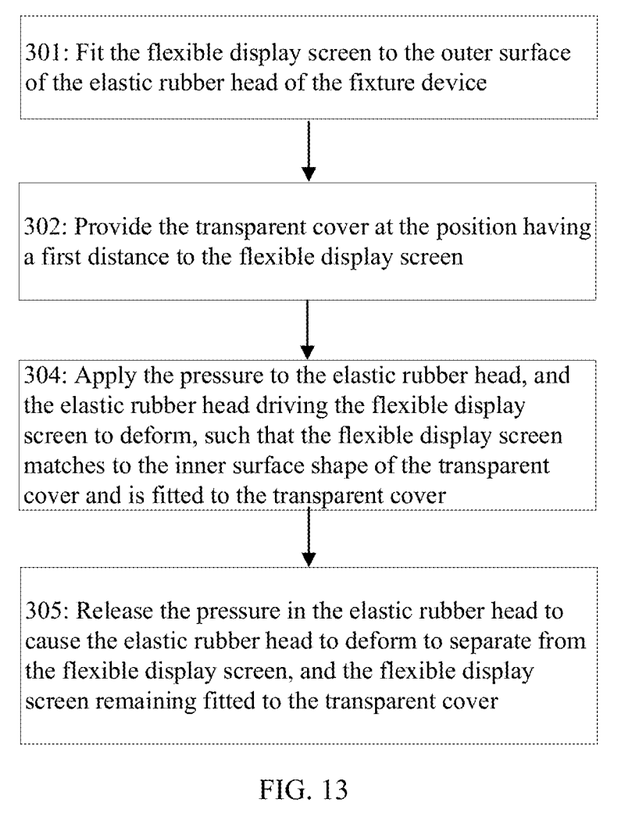
FIG. 13 illustrates a schematic flowchart of a screen fitting method according to some embodiments of the present disclosure.

As shown in FIG. 13, the screen fitting method of embodiments of the present disclosure includes the following processes.

At 301, the flexible display screen is fitted to the outer surface of the elastic rubber head of the fixture device. The elastic rubber head may deform based on the pressure inside the elastic rubber head.

At 302, the transparent cover is provided at the position having a first distance to the flexible display screen. The transparent cover has a solid shape. The transparent cover includes a plate shape flat surface and a sidewall. The sidewall is formed by extending the edge of the flat surface away from the flat surface. The sidewall has a curved structure. The sidewall and the flat surface form an inverted structure.

In embodiments of the present disclosure, the first distance is not limited.

For example, the first distance may be set to be a small value. Then, the flexible display screen may be directly fitted to the transparent cover based on the deformation of the elastic rubber head.

Figure 14:
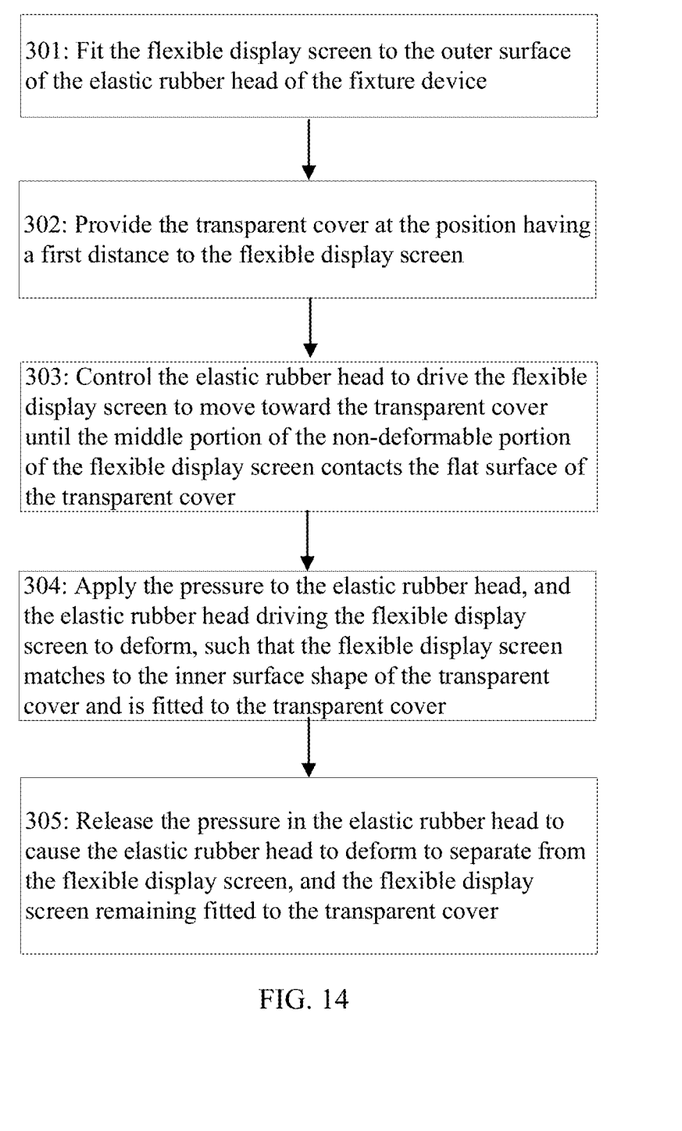
FIG. 14 illustrates a schematic flowchart of a screen fitting method according to some embodiments of the present disclosure.

For another example, the first distance may be set to large. As shown in FIG. 14, before the flexible display screen is fitted to the transparent cover based on the deformation of the elastic rubber head, the method further includes the following processes.

At 303, the elastic rubber head is controlled to drive the flexible display screen to move toward the transparent cover until the middle portion of the non-deformable portion of the flexible display screen contacts the flat surface of the transparent cover.

In some embodiments, the screen fitting method may not include process 303.

At 304, the pressure is applied to the elastic rubber head, and the elastic rubber head drives the flexible display screen to deform, such that the flexible display screen matches to the inner surface shape of the transparent cover and is fitted to the transparent cover.

Figure 15:
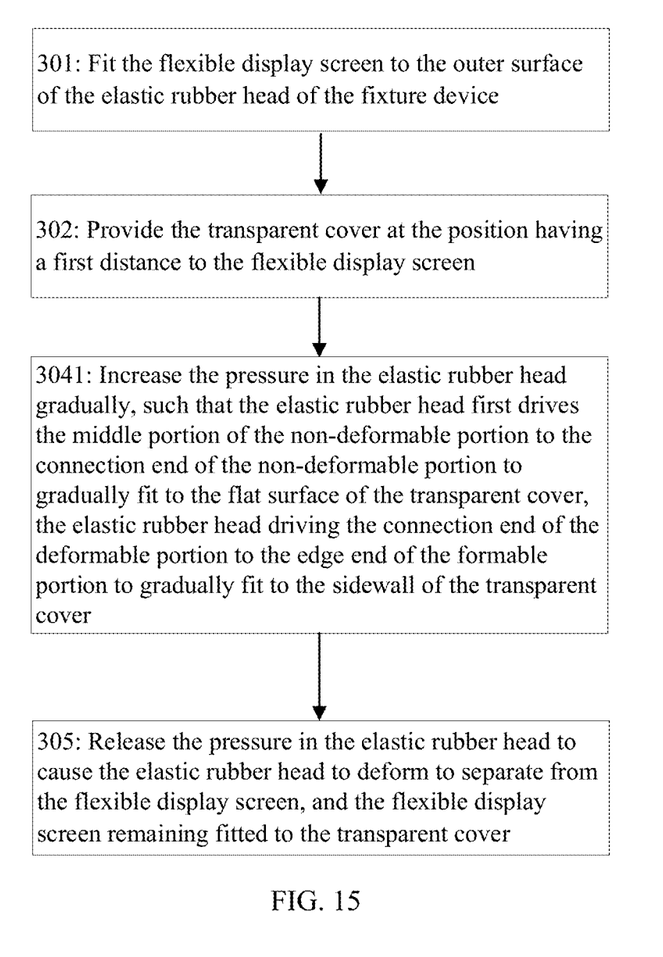
FIG. 15 illustrates a schematic flowchart of a screen fitting method according to some embodiments of the present disclosure.

In some embodiments, to prevent the gas between the flexible display screen and the transparent cover, as shown in FIG. 15, process 304 includes the following processes.

At 3041, the pressure in the elastic rubber head is gradually increased, such that the elastic rubber head first drives the middle portion of the non-deformable portion to the connection end of the non-deformable portion to gradually fit to the flat surface of the transparent cover. The elastic rubber head drives the connection end of the deformable portion to the edge end of the formable portion to gradually fit to the sidewall of the transparent cover.

The implementation of fitting the flexible display screen from the middle of the flexible display screen to the edge end of the flexible display screen to the transparent cover is described in the fixture device embodiments, which is not repeated here.

Those of skilled in the art may set other implementation to prevent the gas between the flexible display screen and the transparent cover.

At 305, the pressure in the elastic rubber head is released to cause the elastic rubber head to deform to separate from the flexible display screen, and the flexible display screen remains fitted to the transparent cover. The non-deformable portion of the flexible display screen is fitted to the flat surface, and the deformable portion of the flexible display screen is fitted to the sidewall.

In some embodiments, when the pressure in the elastic rubber head is released, the elastic rubber head may deform. Then, the volume of the portion of the elastic rubber head next to the flexible display screen may decrease. Thus, the flexible display screen and the transparent cover form the inverted structure shown in FIG. 12. The elastic rubber head may also be easily taken out from the inverted structure formed by the flexible display screen and the transparent cover. The operation is simple.

In the method of embodiments of the present disclosure, by fitting the flexible display screen to the outer surface of the elastic rubber head of the fixture device, the transparent cover is placed at the position having a first distance to the flexible display screen. By applying the pressure in the elastic rubber head, the elastic rubber head drives the flexible display screen to deform, such that the flexible display screen matches with the inner surface shape of the transparent cover and is fitted to the transparent cover. By releasing the pressure in the elastic rubber head, the elastic rubber head deforms to separate from the flexible display screen. The flexible display screen can remain fitted to the transparent cover. As such, the flexible display screen can be fitted to the transparent cover through the elastic rubber head. At the same time, during the operation, the elastic rubber head does not damage the flexible display screen. After the pressure in the elastic rubber head is released, the elastic rubber head can easily deform to separate from the flexible display screen.

Specific embodiments of the present disclosure are described above. However, the scope of the present disclosure is not limited to these specific embodiments. Any person skilled in the art can easily think of changes or replacements within the technical scope disclosed in the present disclosure. These changes or replacements should be within the scope of the present disclosure. Therefore, the scope of the present invention shall be subject to the scope of the claims.

What is claimed is:

1. An electronic device, comprising:
   a transparent cover having a fixed shape and including a plate-shape flat surface and a sidewall, the sidewall being formed by extending an edge of the flat surface away from the flat surface, the sidewall having a curved structure, and the sidewall and the flat surface forming an inverted structure;
   a flexible display screen being fitted to an inner surface of the transparent cover, a display output surface of the flexible display screen facing the transparent cover, the flexible display screen including a non-deformable portion and a deformable portion, the non-deformable portion being fitted to the flat surface, and the deformable portion being fitted to the sidewall; and
   a supporting member fixedly bond to the transparent cover at a position corresponding to an edge of the deformable portion of the flexible display screen and configured to support a portion of the deformable portion near an edge end, the deformable portion of the flexible display screen away from the edge end, and the deformable portion abutting and extending from the an edge of the non-deformable portion away from the non-deformable portion, the deformable portion and the non-deformable portion fitting the inverted structure.

2. The electronic device of claim 1, wherein:
   the sidewall includes a first inner surface having an arc-shape;
   a tangent line of a target point on the first inner surface is perpendicular to the flat surface of the transparent cover; and
   the target point is not an end point of the first inner surface.

3. The electronic device of claim 2, wherein an edge of the deformable portion of the flexible display screen exceeds the target point.

4. The electronic device of claim 1, wherein
   two sidewalls are formed by extending edges of two long sides of the flat surface away from the flat surface; and/or
   two sidewalls are formed by extending edges of two short sides of the flat surface away from the flat surface.

5. The electronic device of claim 2, wherein:
the transparent cover includes at least two sidewalls;
the at least two sidewalls are located on opposite sides of the flat surface, respectively;
edges of the at least two sidewalls have a first width;
target points of the at least two sidewalls are a second width apart; and
the first width is narrower than the second width; or
a vertical plane of the flat surface and an end surface of the sidewall form a first angle, and the first angle is greater than 90°.

6. The electronic device of claim 1, wherein the flexible display screen is bonding to the transparent cover through a transparent glue to form an integrated structure.

7. The electronic device of claim 1, further comprising:
a frame body, the transparent cover having the flexible display screen is mounted at the frame body, the frame body being configured to mount at least one electronic component and a back cover;
wherein in response to the transparent cover having the flexible display screen being mounted at the frame body, the frame body abuts the supporting member, and the frame body is configured to support the non-deformable portion and a portion of the deformable portion away from the edge end.

* * * * *